United States Patent
Kwon et al.

(10) Patent No.: US 7,430,182 B2
(45) Date of Patent: Sep. 30, 2008

(54) SYSTEM AND METHOD FOR CONTROLLING DATA TRAFFIC IN A WIRELESS COMMUNICATION SYSTEM

(75) Inventors: Jae-Woo Kwon, Suwon-si (KR); Jung-Shin Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 377 days.

(21) Appl. No.: 11/343,303

(22) Filed: Jan. 31, 2006

(65) Prior Publication Data
US 2006/0171406 A1    Aug. 3, 2006

(30) Foreign Application Priority Data
Jan. 31, 2005 (KR) .................. 10-2005-0008651

(51) Int. Cl.
*H04Q 7/20* (2006.01)
(52) U.S. Cl. .................. 370/310; 370/349
(58) Field of Classification Search .......... 370/310, 370/310.2, 349, 352, 392, 389, 395.5, 395.52, 370/400, 401, 399, 475, 476, 471; 709/223, 709/220, 229, 230, 227, 228, 240, 145, 247
See application file for complete search history.

(56) References Cited

U.S. PATENT DOCUMENTS

| | | | | | |
|---|---|---|---|---|---|
| 6,961,349 | B2 * | 11/2005 | Malomsoky et al. | ......... | 370/469 |
| 6,982,957 | B2 * | 1/2006 | Kiiski et al. | ................. | 370/235 |
| 7,230,931 | B2 * | 6/2007 | Struhsaker | ................... | 370/280 |
| 2002/0072382 | A1 * | 6/2002 | Fong et al. | ................. | 455/507 |
| 2002/0097723 | A1 * | 7/2002 | Tourunen et al. | ............ | 370/392 |
| 2003/0174662 | A1 * | 9/2003 | Malkamaki | ................. | 370/310 |
| 2004/0146033 | A1 | 7/2004 | Soderstrom et al. | | |
| 2005/0030940 | A1 * | 2/2005 | Abrol et al. | ................. | 370/352 |
| 2006/0077919 | A1 * | 4/2006 | Gerkis | ........................ | 370/315 |
| 2006/0090068 | A1 * | 4/2006 | Andersen et al. | ........... | 713/160 |

FOREIGN PATENT DOCUMENTS

EP    1 317 110    6/2003
WO   WO 2004/077747   9/2004

OTHER PUBLICATIONS

IEEE Std. 802.16-2004, Part 16: Air Interface for Fixed Broadband Wireless Access Systems, Oct. 1, 2004.
Duros et al., A Link Layer Tunneling Mechanism for Unidirectional Links, Internet Engineering Task Force, Feb. 2000.

* cited by examiner

*Primary Examiner*—Jean A Gelin
(74) *Attorney, Agent, or Firm*—The Farrell Law Firm, PC

(57) ABSTRACT

A method is provided for controlling uplink data traffic in a wireless communication system. If Internet Protocol (IP) packets are received from a higher layer, one or more medium access control service data units (MAC SDUs) are generated in units of sub-blocks. A modified packing sub-header (PSH) used for distinguishing between the MAC SDUs is added to the generated MAC SDUs. MAC SDUs having the same connection identifier (CID) among the modified PSH-added MAC SDUs are grouped. A modified MAC header (MH) used for distinguishing between the MAC SDU groups is added to generate one or more tunnel messages, and the generated tunnel messages are grouped. A tunnel frame header used for distinguishing between the tunnel messages to generate a tunnel frame is added thereto. The generated tunnel frame is transmitted to a base station.

37 Claims, 7 Drawing Sheets

SYSTEM AND METHOD FOR CONTROLLING DATA TRAFFIC IN A WIRELESS COMMUNICATION SYSTEM

PRIORITY

This application claims the benefit under 35 U.S.C. § 119(a) of an application entitled "System and Method for Controlling Data Traffic in a Wireless Communication System" filed in the Korean Intellectual Property Office on Jan. 31, 2005 and assigned Serial No. 2005-8651, the contents of which are incorporated herein by reference.

BACKGROUND OF THE INVENTION

1. Field of the Invention

The present invention relates generally to a wireless communication system, and in particular, to a system and method for controlling flow of data traffic in a wireless communication system.

2. Description of the Related Art

Technologies generally used to provide data service to users in the current wireless communication environment are classified into a $2.5^{th}$ Generation or $3^{rd}$ Generation cellular mobile communication technology such as Code Division Multiple Access 2000 1x Evolution Data Optimized (CDMA2000 1xEVDO), General Packet Radio Services (GPRS) and Universal Mobile Telecommunication Service (UMTS), and a wireless Local Area Network (LAN) technology such as the Institute of Electrical and Electronics Engineers (IEEE) 802.11 Wireless LAN.

In parallel with the evolution of the mobile communication technologies, various local wireless access technologies such as an IEEE 802.16-based wireless LAN have appeared. The local wireless access technologies have been proposed to provide high-speed data service in a wireless environment, replacing wire communication networks such as a cable modem or xDSL (Digital Subscriber Line) in hot spot areas such as public places and schools or in a home network environment.

However, when high-speed data service is provided using the wireless LAN, there are limitations in providing public network service to users due to interference as well as limited mobility and narrow service area.

The communication systems do not have a scheme proposed to efficiently deal with a wireless Internet service request from a user, for example, an MS. That is, the current systems do not have a scheme proposed to control flow of data traffic between base stations (BSs), for example, a radio access station (RAS) and an access control router (ACR), which receive a service request from an MS.

Accordingly, there is a need for a scheme for efficient data control between a RAS and an ACR in response to a service request from a user in the communication system.

SUMMARY OF THE INVENTION

It is, therefore, an object of the present invention to provide an efficient data control scheme between BSs in a wireless communication system.

It is another object of the present invention to provide a system and method for controlling flow of data traffic between BSs to improve handover performance in a wireless communication system.

It is further another object of the present invention to provide a system and method for controlling the amount of traffic to prevent an increase in delay time due to packet delivery between BSs during handover in a wireless communication system.

It is yet another object of the present invention to provide a system and method for preventing overflow and underflow at a BS in a wireless communication system.

According to one aspect of the present invention, there is provided a system for controlling data traffic in a wireless communication system. The system includes a base station controller for, upon receiving specific Internet Protocol (IP) packets from a higher layer, adding thereto a modified packing sub-header (PSH) used for distinguishing between the IP packets to generate a medium access control service data unit (MAC SDU) in units of sub-blocks, grouping MAC SDUs having the same connection identifier (CID) among the modified PSH-added MAC SDUs, adding thereto a modified MAC header (MH) used for distinguishing between the groups to generate at least one tunnel message, grouping the generated tunnel messages, generating a tunnel frame including a tunnel frame header used for distinguishing between the tunnel messages, and transmitting the generated tunnel frame; and a base station for, if a CID value of a received MAC header is a transport CID, removing an MH from a corresponding MAC packet data unit (PDU), adding thereto a modified MH, adding a base station controller control information element included in an information element used for checking its buffer status to an end of the modified MH, generating a generic routing encapsulation (GRE) packet, and transmitting the generated GRE packet through a tunnel to the base station controller.

According to another aspect of the present invention, there is provided a method for controlling uplink data traffic in a wireless communication system. The method includes, upon receiving Internet Protocol (IP) packets from a higher layer, generating at least one medium access control service data unit (MAC SDUs) in units of sub-blocks; adding a modified packing sub-header (PSH) used for distinguishing between the MAC SDUs, to the generated MAC SDUs; grouping MAC SDUs having the same connection identifier (CID) among the modified PSH-added MAC SDUs; adding a modified MAC header (MH) used for distinguishing between the MAC SDU groups to generate at least one tunnel message; grouping the generated tunnel messages, and adding thereto a tunnel frame header used for distinguishing between the tunnel messages to generate a tunnel frame; and transmitting the generated tunnel frame to a base station.

According to a further aspect of the present invention, there is provided a method for controlling downlink data traffic in a wireless communication system. The method includes, if a connection identifier (CID) value of a received medium access control (MAC) header is a transport CID, removing a MAC header (MH) of a corresponding MAC packet data unit (PDU); after removing the MH, adding thereto a modified MH to generate at least one tunnel message; and grouping the generated tunnel messages, generating a tunnel frame including a tunnel frame header used for distinguishing the tunnel messages, and transmitting the generated tunnel frame.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention provides a system and method for efficient data control in a wireless communication system. Specifically, the present invention provides a scheme for efficient data control between base stations (BSs).

In addition, the present invention provides an interface between a radio access station (RAS) and an access control router (ACR) in the system, and provides a data control procedure for improving handover performance of a mobile station (MS) through the same.

With reference to the schematic diagram of FIG. 1, a description will now be made of a configuration of a general wireless communication system to which the present invention is applicable.

Figure 1:
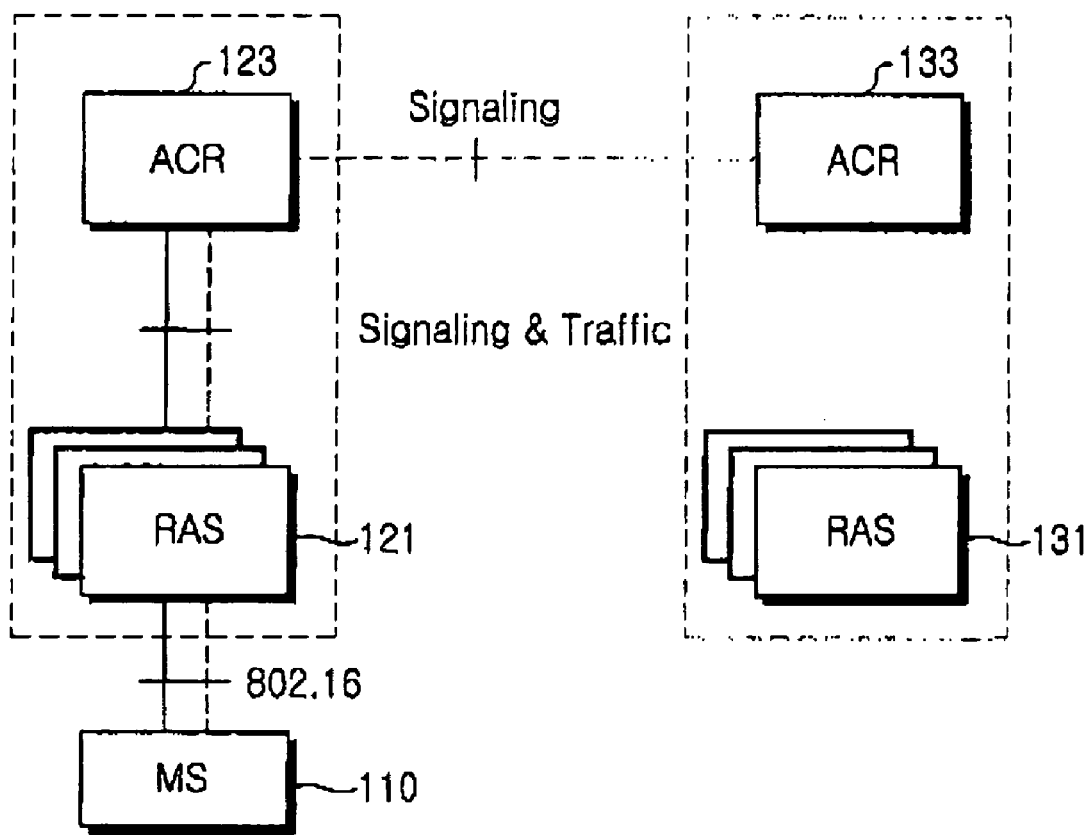
FIG. 1 is a diagram schematically illustrating a configuration of a general wireless communication system.

Referring to FIG. 1, a general wireless communication system includes an MS 110, RASs 121 and 131 for performing wireless communication with the MS 110, and ACRs 123 and 133 for controlling functions of the RASs 121 and 131.

As illustrated in FIG. 1, the ACRs 123 and 133, which are systems interposed between a core network (CN) and the RASs 121 and 131, perform a Convergence Sublayer (CS) function, an Automatic Repeat reQuest (ARQ) processing function, a handover control function, etc. In addition, the ACRs 123 and 133 provide an interface with the CN.

The RASs 121 and 131, which are systems interposed between the ACRs 123 and 133 and the MS 110, provide a wireless access interface based on the wireless access standard, for example, the Institute of Electrical and Electronics Engineers (IEEE) 802.16 standard.

The MS 110, which is an end point of a wireless channel, is connected to the RASs 121 and 131 and performs communication with them according to the wireless access standard.

A description will now be made of a scheme for efficiently controlling data traffic in response to a wireless Internet service request from a user, for example, an MS, in the communication system. With reference to the diagram of FIG. 2, a description will now be made of an interface in a communication system between the ACR and the RAS shown in FIG. 1.

Figure 2:
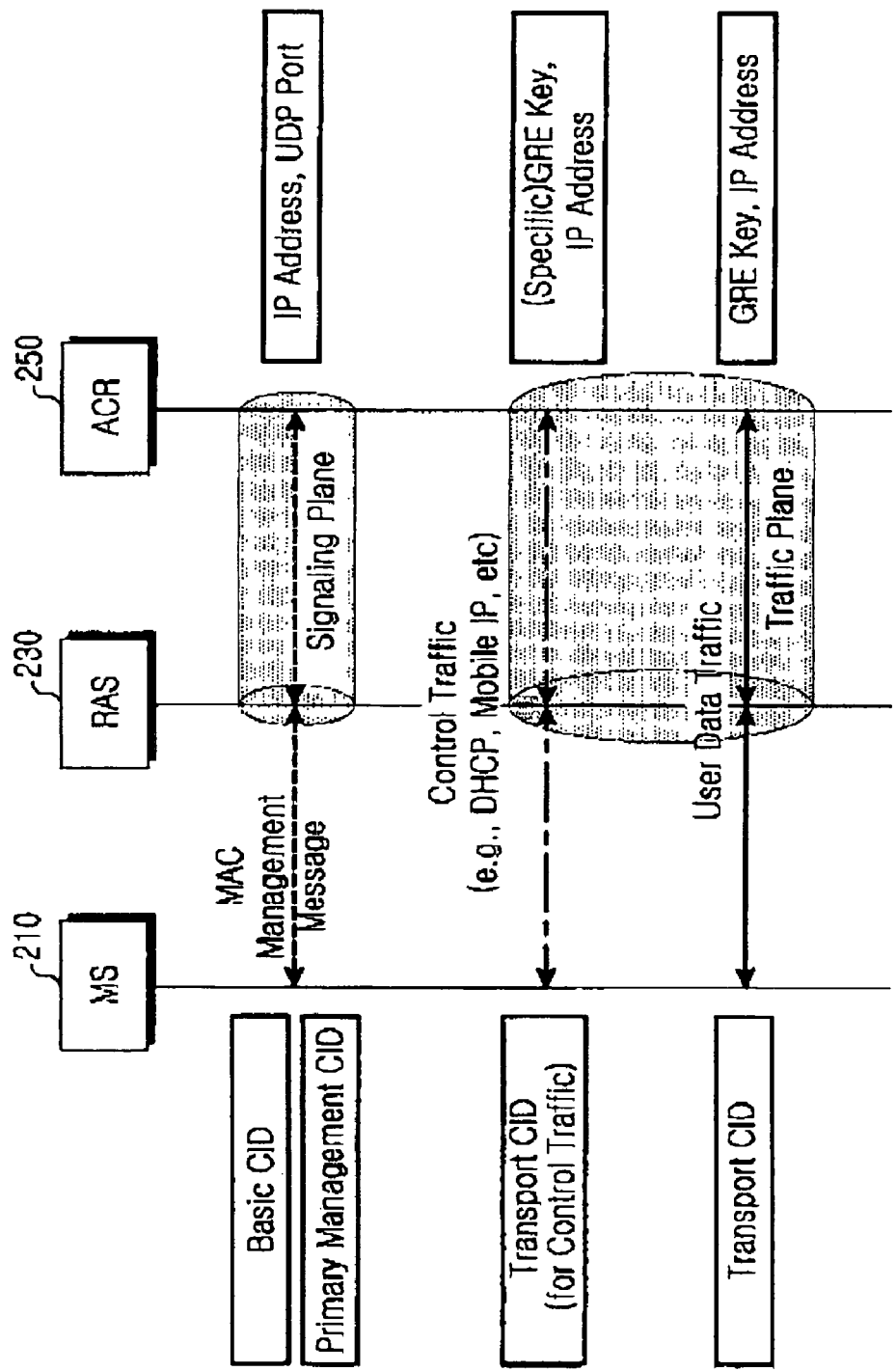
FIG. 2 is a diagram illustrating an exemplary interface structure in a communication system according to an embodiment of the present invention.

Referring to FIG. 2, the present invention defines an interface based on a signaling and traffic processing scheme between a RAS 230 and an ACR 250 in a wireless communication system.

A description will first be made of an interface in a signaling plane. An interface in the signaling plane defines a signaling message necessary between the RAS 230 and the ACR 250, e.g., a session control message, and controls a traffic path through the session control message. Herein, the session control message corresponds to a Medium Access Control (MAC) Management message. The interface in the signaling plane manages a Generic Routing Encapsulation (GRE) tunnel between the RAS 230 and the ACR 250.

Next, a description will be made of an interface in a traffic plane. An interface in the traffic plane performs flow control and ARQ control between the RAS 230 and the ACR 250, and defines a sub-header therefor.

More specifically, as illustrated in FIG. 2, the signaling plane between the RAS 230 and the ACR 250 defines a session control message necessary between a RAS and an ACR (hereinafter referred to as a "RAS-ACR session control message"), and manages a traffic path.

That is, upon receiving a Ranging Request (RNG-REQ) message with an Initial Ranging Connection ID (CID) from the MS 210, the RAS 230 transmits the above-described signaling message using a default Internet Protocol (IP) address/port number of the ACR 250.

Upon receipt of the signaling message, the ACR 250 allocates an IP address/port number for each individual Basic Management CID and Primary Management CID to respond to the signaling message from the RAS 230.

Thereafter, upon receiving a MAC Management message with Basic Management CID and Primary Management CID from the MS 210, the RAS 230 transports the signaling message using an IP address and User Datagram Protocol (UDP) port number for each individual CID of the ACR 250, determined in an initial ranging process.

The traffic plane between the RAS 230 and the ACR 250 transmits RAS-ACR control traffic or user traffic, and defines a sub-header including additional information necessary for ARQ and flow control.

The control traffic for Dynamic Host Configuration Protocol (DHCP) and Mobile IP is allocated a particular Transport CID, and is transported using a particular GRE Tunnel Key and IP address for RAS-ACR control traffic. The user data traffic has a Transport CID, and is transported using a RAS-ACR GRE Tunnel Key and IP address.

The present invention provides a scheme for controlling flow and the amount of RAS-ACR data traffic and preventing overflow and underflow in the RAS to improve handover performance in the wireless communication system shown in FIGS. 1 and 2.

Figure 3:
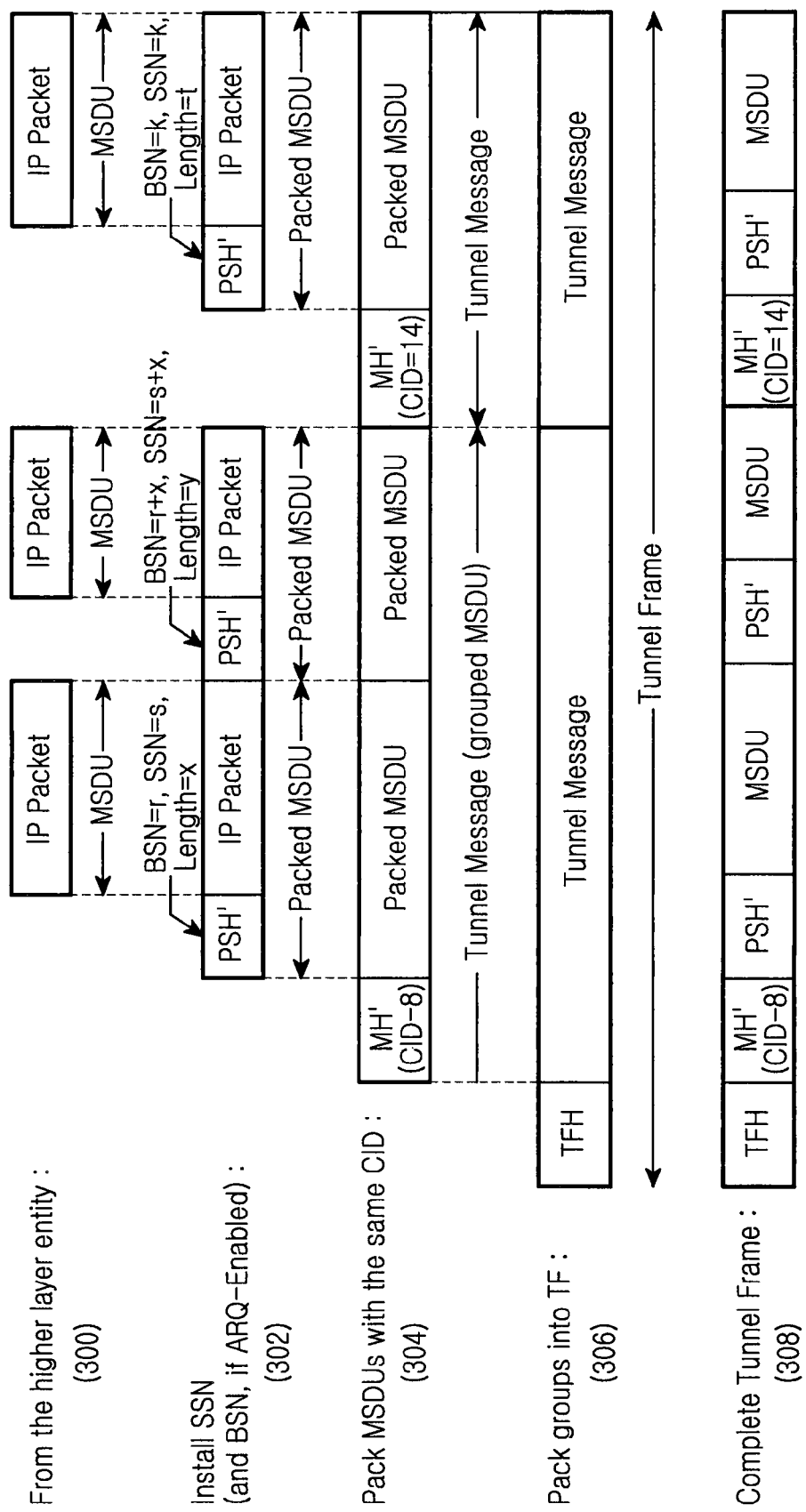
FIG. 3 is a diagram schematically illustrating a process of creating a tunnel frame for data traffic control according to an embodiment of the present invention.

FIG. 3 is a diagram schematically illustrating a process of creating a tunnel frame for data traffic control according to the present invention.

Referring to FIG. 3, a payload transported through a GRE protocol represents data traffic scheduled to be transported between a RAS and an ACR (hereinafter referred to as "RAS-ACR data traffic"). The payload transported through the GRE protocol includes modified MAC Headers for Hbis (MH') for an interface, for example an Hbis interface, between the RAS and the ACR, and MAC Service Data Unit (MAC SDU) groups.

The MAC SDU group is a set of MAC SDUs having the same CID value, and MH' represents a header defined to distinguish MAC SDU groups in a GRE payload. A modified Packing Sub-Header for Hbis (PSH') for the interface shown in FIG. 3, for example, the Hbis interface, serves to distinguish each MAC SDU or MAC SDU fragment in a corresponding group.

As illustrated in FIG. 3, upon receiving IP packets, for example, MAC SDUs, from a higher layer in step 300, an ACR adds thereto PSH's used for distinguishing the received IP packets thereby to generate a MAC SDU packed in units of sub-blocks in step 302.

An exemplary format of the PSH' is shown in Table 1.

TABLE 1

| Syntax | Size | Notes |
|---|---|---|
| Modified_Packing_Subheader_tunnel ( ) { | | |
| FC | 2 bits | Indicates the fragment state of the payload |
| | | 00: no fragmentation |
| | | 01: last fragment |
| | | 10: first fragment |
| | | 11: continuing (middle) fragment |
| if (ARQ-enabled connection) { | | |
| Reserved | 2 bits | set to zero |
| ReTX | 1 bit | ReTX indicates whether this payload is a retransmission. |
| | | This field is meaningful only for the tunnel messages made by the ACR. |
| | | 0: normal transmission |
| | | 1: retransmission |
| BSN | 11 bits | sequence number of the first ARQ blocks in the current SDU fragment |
| SSN | 16 bits | sequence number of the first sub-block blocks in the current SDU fragment |
| } else { | | |
| Reserved | 6 bits | set to zero |
| SSN | 11 bits | sequence number of the first sub-block blocks in the current SDU fragment |
| } | | |
| Reserved | 5 bits | set to zero |
| Length | 11 bits | length of the payload including this header |
| } | | |

As is shown above, Table 1 shows a modified format of a Packing Sub-Header (PSH), i.e., a modified PSH (PSH'). Referring to Table 1, the PSH' serves to distinguish between MAC SDUs or MAC SDU fragments in a particular group. The PSH' includes Block Sequence Number (BSN) information, a Sub-block Sequence Number (SSN), and Length information.

The term "sub-block" as used herein refers to the minimum constituent unit used for generating a tunnel message from the MAC SDU in the ACR. That is, the tunnel message includes a predetermined number of sub-blocks, and it is preferable that the tunnel message is created using a unit that is larger in size than a predetermined sub-block.

For an ARQ-enabled connection, the SSN included in the PSH' is defined as a sequence number that increases by one each time one block is transmitted. However, for an ARQ-disabled connection, the SSN is defined as a sequence number that is assigned to each sub-block to indicate a position in a MAC SDU in a process of segmenting a MAC SDU into sub-blocks. For the ARQ-disabled connection, a size of the sub-blocks used during the MAC SDU segmentation is determined through a negotiation between the ACR and the RAS at a set time for the corresponding connection, and 1 byte is used as its default value.

Thereafter, the ACR makes one MAC SDU group by grouping MAC SDUs having the same CID value among the generated MAC SDUs, and adds MH's thereto, thereby generating a Tunnel message in step 304. Herein, the MAC SDU group means a set of MAC SDUs having the same CID value, and the MH' represents a header defined to distinguish between MAC SDU groups in a GRE payload. An exemplary message format of the MH' is shown in FIG. 2.

TABLE 2

| Syntax | Size | Notes |
|---|---|---|
| Modified_MH_tunnel ( ) { | | |
| Type | 5 bits | Indicates the payload type, including presence of sub-headers |
| Length | 11 bits | Total size of the included fragments and header |
| CID | 16 bits | CID value of the included fragments |
| } | | |

As is shown above, Table 2 shows a modified format of a MAC header (MH), i.e., a modified MH (MH'). Referring to Table 2, the MH' includes Type/Length/Value (TLV) information, i.e., Type, Length and Value information. The 5-bit Type information includes information on payload types including presence of sub-headers. The 11-bit Length information includes information on the total length including header lengths of the MAC SDU fragments. Exemplary information on the payload based on the Type information is shown in Table 3 and Table 4.

TABLE 3

| Type bit | Value |
|---|---|
| #4 | RAS Control Information Element |
| #3 | ARQ feedback payload |
| #2 | Reserved |
| #1 | Reserved |
| #0 | Modified Packing sub-header |

TABLE 4

| Type bit | Value |
|---|---|
| #4 | ARC Control Information Element |
| #3 | ARQ feedback payload |
| #2 | Extended Type |
| #1 | Fragmentation sub-header |
| #0 | Packing sub-header |

Table 3 shows Type values of a downlink NH' for an interface used in the present invention, and Table 4 shows Type values of an uplink MH' for an interface used in the present invention.

Referring to Table 3, for the downlink MH', a $4^{th}$ bit among 5 Type bits includes a RAS Control Information Element (IE), and an exemplary format of the RAS Control IE is shown in Table 5.

TABLE 5

| Syntax | Size | Notes |
|---|---|---|
| RAS_Control_IE ( ) { | | |
| Length | 8 bits | Total message length in bytes |
| Control_Type | 3 bits | 0: ARQ discard |
| | | 1: ARQ reset |
| | | 2: Buffer Flush |

Table 5 shows a format of a RAS Control IE for an interface used in the present invention. Referring to Table 5, if a Control_Type value is set to, for example, 2 to share RAS-ACR buffer status information, it indicates that the ACR sends a request for buffer status information to the RAS. For example, Control_Type value='0' indicates ARQ discard, Control_Type value='1' indicates ARQ reset, and Control_Type value='2' indicates Buffer Flush.

Referring to Table 4, for the uplink MH', a $4^{th}$ bit among 5 Type bits includes an ACR Control IE, and an exemplary format of the ACR Control IE is shown in Table 6 below.

TABLE 6

| Syntax | Size | Notes |
|---|---|---|
| ACR_Control_IE ( ) { | | |
| Length | 8 bits | Total message length in bytes |
| Control_Type | 3 bits | 0: ARQ discard |
| | | 1: ARQ reset |
| | | 2: Buffer Status Report |
| | | 3-7: reserved |
| if {Control_Type = 0} { | | |
| BSN | 11 bits | Sequence number of the last block in the transmission window that the transmitter wants to discard |
| reserved | 2 bits | Shall be set to zero |
| } else if (Control_Type = 1) { | | |
| Type | 2 bits | 00 = original message from the initiator |
| | | 01 = acknowledgement from responder |
| | | 10 = confirmation from the initiator |
| | | 11 = reserved |
| reserved | 3 bits | Shall be set to zero |
| } else if (Control_Type = 2) { | | |
| Num | 8 bits | Number of the included queue status information elements |

TABLE 6-continued

| Syntax | Size | Notes |
|---|---|---|
| reserved | 5 bits | Shall be set to zero |
| for (i=0; i<Num; i++) { | | |
| Q_Status_IE | variable | Information on the status of the downlink RAS buffer |
| } | | |
| } | | |
| } | | |

Table 6 shows a format of an ACR Control IE for an interface used in the present invention. Referring to Table 6, if a Control_Type value is set to, for example, 2 to share RAS-ACR buffer status information, it indicates that the RAS reports its buffer status. For example, Control_Type value='0' indicates ARQ discard, Control_Type value='1' indicates ARQ reset, and Control_Type value='2' indicates Buffer Status Report.

For the Control_Type value='2', a Queue Status Information Element (Q_Status_IE) includes status information of downlink RAS buffers. An exemplary format of the Q_Status_IE is shown in Table 7.

TABLE 7

| Syntax | Size | Notes |
|---|---|---|
| Q_Status_IE ( ) { | | |
| CID | 16 bits | CID to designate the downlink buffer whose status information is reported |
| TX_Q_Available_Size | 32 bits | Available transmission buffer size in bytes |
| TX_SSN_TAIL | 16 bits | Sequence number of the sub-block at the tail of the transmission buffer |
| TX_SSN_HEAD | 16 bits | Sequence number of the sub-block at the head of the transmission buffer |
| if (ARQ-enabled connection) { | | |
| ReTX_Q_Available_Size | 32 bits | Available retransmission buffer size in bytes |
| ReTX_SSN_TAIL | 16 bits | Sequence number of the sub-block at the tail of the retransmission buffer |
| ReTX_SSN_HEAD | 16 bits | Sequence number of the sub-block at the head of the retransmission buffer |
| } | | |
| } | | |

Table 7 shows a format of a Q_Status_IE for an interface used in the present invention.

As described above, the present invention defines the minimum constituent unit used for generating a tunnel message from a MAC SDU in the ACR, as a sub-block. The tunnel message includes one or more sub-blocks, and cannot be created using a unit that is smaller in size than a predetermined sub-block.

Referring back to FIG. 3, the ACR groups the generated tunnel messages and adds thereto a Tunnel Frame Header (TFH), i.e., a GRE header, thereby generating one tunnel frame in step 306. Thereafter, the ACR transmits the generated tunnel frame to the RAS in step 308.

Figure 4A:
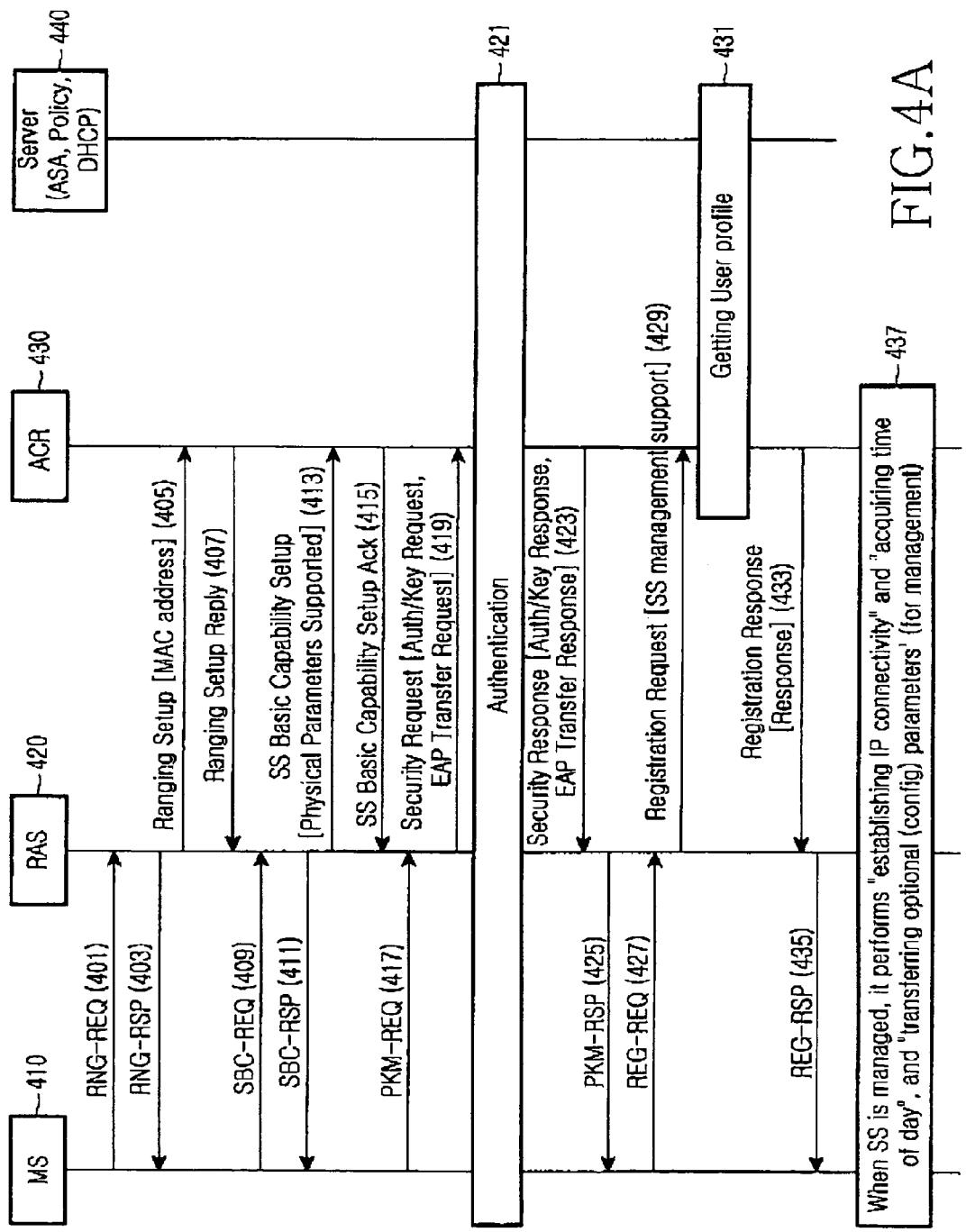
FIG. 4 is a diagram illustrating an initial call setup signaling procedure in a wireless communication system according to an embodiment of the present invention.
Figure 4B:
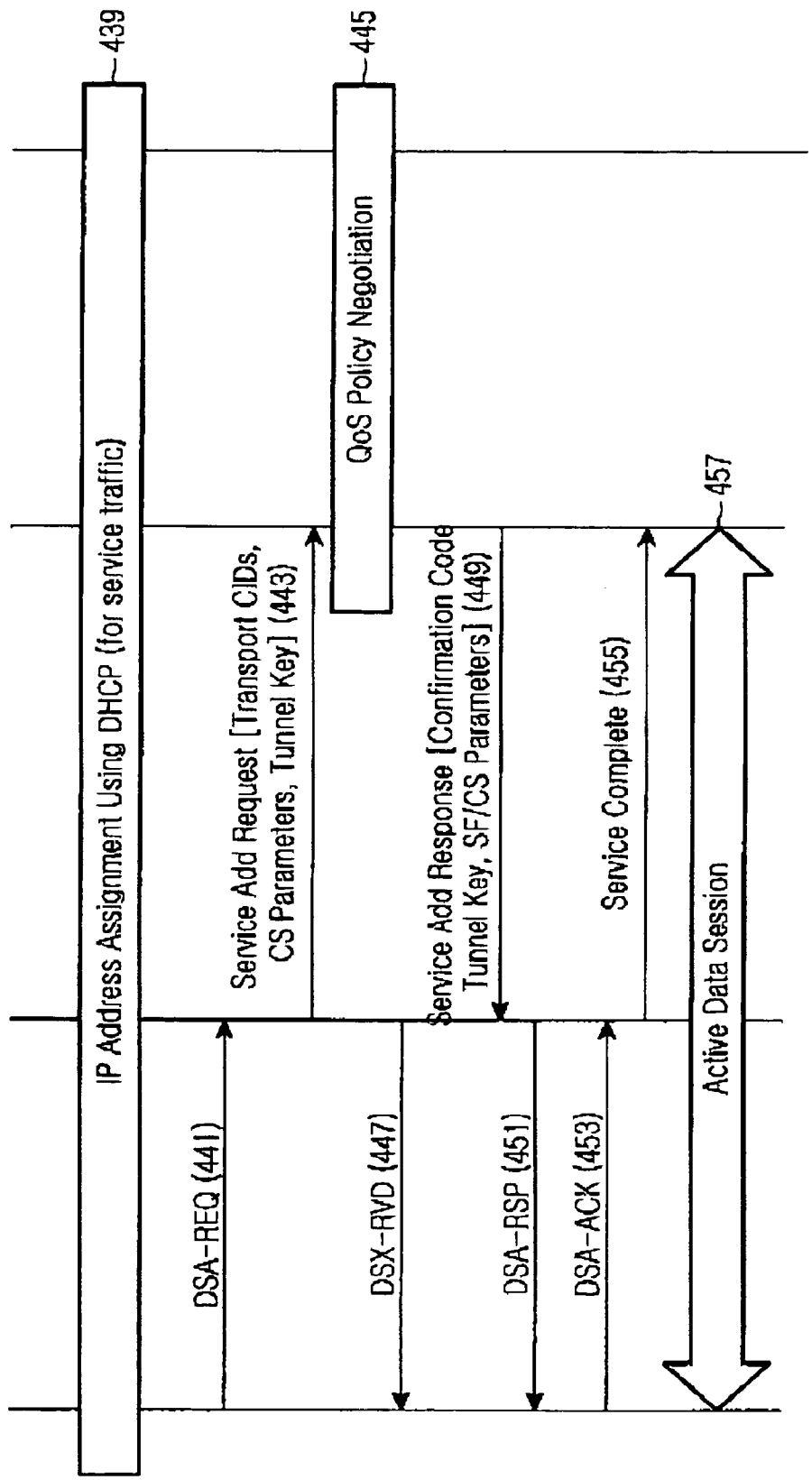

FIG. 4 is a diagram illustrating an initial call setup signaling procedure in a wireless communication system according to the present invention.

Referring to FIG. 4, during initial connection, an MS 410 periodically receives Downlink Channel Descriptor (DCD), DL-MAP and UL-MAP messages from a RAS 420, scans the received messages, and acquires downlink (DL) channel synchronization and uplink (UL) parameters. Thereafter, the MS 410 transmits a RNG-REQ message with an Initial Ranging CID to the RAS 420 along with its own MAC address in step 401. In response to the RNG-REQ message, the RAS 420 allocates a Basic & Primary Management CID necessary for the MS 410, and transmits a Ranging-Response (RNG-RSP) message with the Basic & Primary Management CID to the MS 410 in step 403.

Subsequently, the RAS 420 transmits to an ACR 430 a Ranging Setup message including the Basic & Primary Management CID as a default IP address and UDP port number of the ACR 430 connected thereto, in step 405. The default IP address and UDP port number of the ACR 430 provide a signaling path for the Initial Ranging CID. The ACR 430 transmits to the RAS 420 a Ranging Setup Reply message including an IP address/port number for signaling for the individual Basic & Primary Management CID allocated from the RAS 420 in step 407.

The MS 410 transmits to the RAS 420 a Subscriber Station's Basic Capability Negotiation Request (SBC-REQ) message including its available Physical parameter and Authorization policy information in step 409. Then the RAS 420 transmits to the MS 410 a Subscriber Station's Basic Capability Negotiation Response (SBC-RSP) message after setting a parameter requested by the MS 410 and a common value in its own parameter in step 411.

Thereafter, the RAS 420 sends to the ACR 430 an SS Basic Capability Setup message including Basic Capability information of the negotiated MS 410 in step 413. The ACR 430 transmits an SS Basic Capability Setup Ack message to the RAS 420 in response to the SS Basic Capability Setup message received from the RAS 420 in step 415.

The MS 410 transmits to the RAS 420 a Privacy Key Management Request (PKM-REQ) message for connection authentication in step 417. The PKM-REQ message is classified into Authorization Request, Key Request and Extensible Authentication Protocol (EAP) Transfer Request messages according to their message types. The MS 410 can transmit the PKM-REQ message for each individual message type, and they are included in one PKM-REQ message in FIG. 4, for convenience. Upon receiving the PKM-REQ message from the MS 410, the RAS 420 transmits a Security Request message with an authentication-related parameter to the ACR 430 in step 419. Then, in step 421, the ACR 430 uses an EAP for authentication of the subscriber, i.e., the MS 410, and exchanges EAP authentication parameters with an Authentication, Authorization and Accounting (AAA) server 440.

Subsequently, the ACR 430 stores the authentication parameter and transmits a Security Response message in response to the Security Request message from the RAS 420 in step 423. The Security Response message is classified into Authorization Response, Key Response and EAP Transfer Response messages according to their message types. The RAS 420 stores the authentication parameter transmitted from the ACR 430, and transmits a Privacy Key Management Response (PKM-RSP) to the MS 410 in response to the PKM-REQ message for each individual message type in step 425.

Upon receiving the PKM-RSP message, the MS 410 transmits to the RAS 420 a Registration Request (REG-REQ) message including registration information such as its own service and CS related Capability information, ARQ parameter, and Management mode support indication information in step 427. Upon receiving the REG-REQ message from the MS 410, the RAS 420 allocates a Secondary Management CID and then transmits a Registration Request message with the Registration information to the ACR 430 in step 429.

The ACR 430 transmits to the RAS 420 a Registration Response message including the result for the registration information requested from the RAS 420 and a REG Tunnel Key and IP address for the Secondary Management CID in step 433. In this case, the ACR 430 acquires valid registration information for the MS 410 through the subscriber policy server 440 in step 431. This process may be performed in the authentication process. Upon receiving the Registration Response message from the ACR 430, the RAS 420 transmits to the MS 410 a Registration Response (REG-RSP) including the result for the registration information requested from the MS 410 and the Secondary Management CID in step 435.

In step 437, the MS 410, if it supports an SS & IP Management mode, additionally acquires an IP address and a parameter necessary for management and is managed in an IP Management manner. Thereafter, the MS 410 performs a DHCP process to acquire an IP address necessary for a service in step 439. Subsequently, the MS 410 transmits to the RAS 420 a Dynamic Service Addition Request (DSA-REQ) message including a Service Flow (SF) and CS parameter to setup a new call in step 441.

Upon receiving the DSA-REQ message from the MS 410, the RAS 420 allocates a Transport CID, and then transmits to the ACR 430 a Service Add Request message including an SF/CS parameter and also including a GRE Tunnel Key and IP address for traffic tunneling with the ACR 430 in step 443. Upon receiving the Service Add Request message from the RAS 420, the ACR 430 negotiates Quality-of Service (QoS) Policy Information for a subscriber, i.e., the MS 410, with the Policy server 440 in step 445. In this case, the RAS 420 transmits to the MS 410 a DSX-RVD message to inform the MS 410 that the DSA process is underway, in step 447.

After the negotiation with the server 440, the ACR 430 transmits to the RAS 420 a Service Add Response message including a Confirmation Code and a requested SF/CS parameter result value and also including a GRE Tunnel Key and IP address for traffic tunneling with the RAS 420 in step 449. Upon receiving the Service Add Response message from the ACR 430, the RAS 420 transmits to the MS 410 a Dynamic Service Addition Response (DSA-RSP) message including a Confirmation Code and an SF/CS parameter result value requested by the MS 410 in step 451.

Upon successfully receiving the DSA-RSP message transmitted from the RAS 420, the MS 410 transmits a DSA-ACK message to the RAS 420 in response thereto in step 453. Upon receiving the DSA-ACK message from the MS 410, the RAS 420 transmits in step 455 a Service Complete message to the ACR 430 to report whether it has succeeded in service generation. Thereafter, if traffic connection is established through the foregoing procedure, the MS 410 performs ARQ and Flow Control with the RAS 420 and the ACR 430 in step 457.

Figure 5:
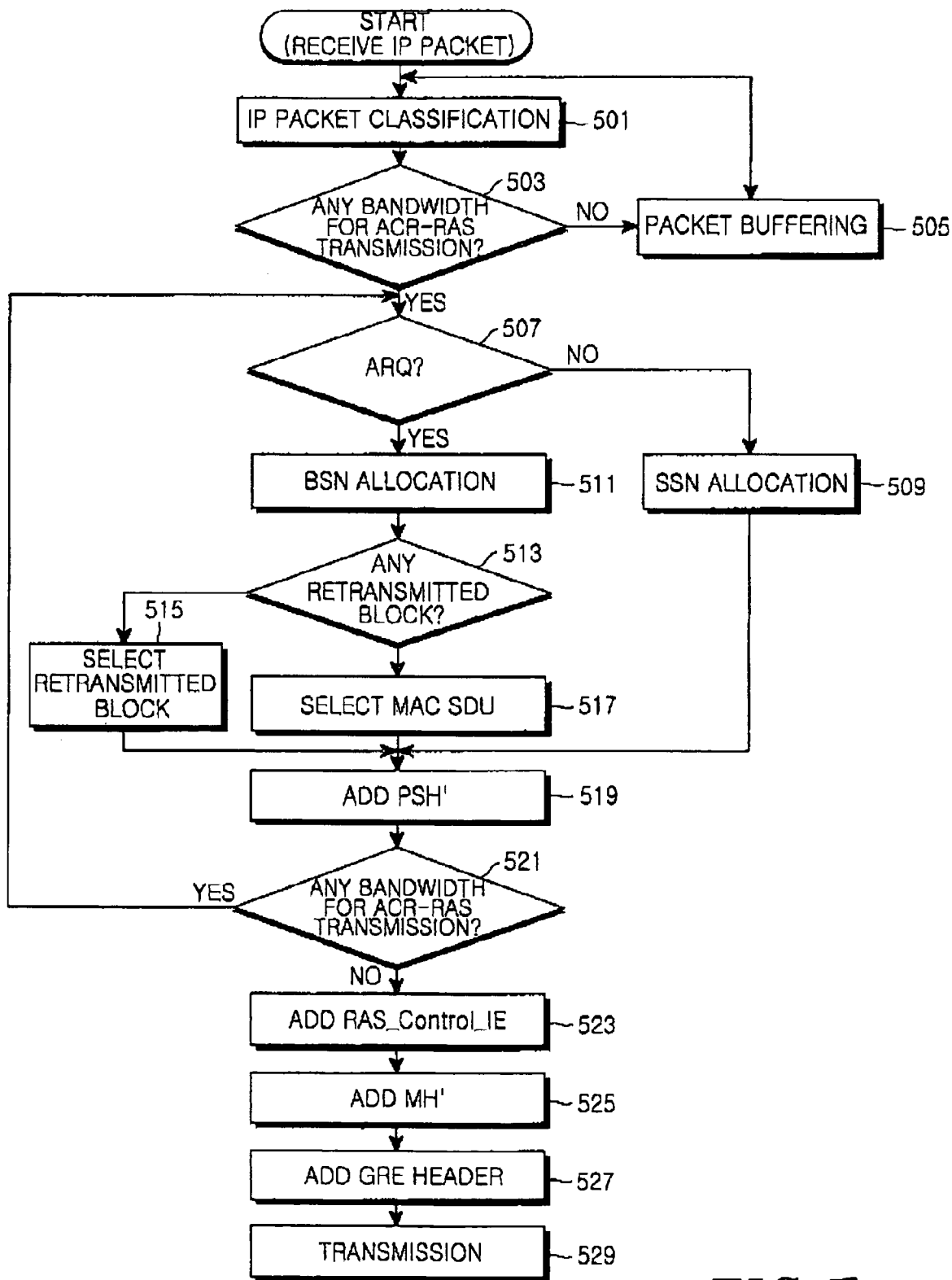
FIG. 5 is a diagram illustrating a downlink packet generation process in a wireless communication system according to an embodiment of the present invention.

FIG. 5 is a flowchart illustrating a downlink packet generation process in a wireless communication system according to the present invention.

Referring to FIG. 5 that illustrates a process of generating downlink packet transmitted from an ACR to a RAS, upon receipt of an IP packet, the ACR classifies the received IP packet in step 501, and determines in step 503 whether there is any available bandwidth for ACR-RAS transmission.

If it is determined in step 503 that there is no available transmission bandwidth, the ACR performs packet buffering in step 505 and then returns to the initial step.

However, if it is determined in step 503 that there is available transmission bandwidth, the ACR determines in step 507 whether the received packet is an ARQ-transmitted packet.

If it is determined in step 507 that the received packet is not an ARQ-transmitted packet, the ACR allocates an SSN in step 509, and then proceeds to step 519.

However, if it is determined in step 507 that the received packet is an ARQ-transmitted packet, the ACR allocates a BSN in step 511, and determines in step 513 whether there is any retransmitted block.

If it is determined in step 513 that there is a retransmitted block, the ACR selects the retransmitted block in step 515, and then proceeds to step 519.

However, if it is determined in step 513 that there is no retransmitted block, the ACR selects a MAC SDU in step 517, and then proceeds to step 519.

In step 519, the ACR adds a PSH' to the retransmitted block selected in step 515 or the MAC SDU selected in step 517. The ACR re-determines in step 521 whether there is any available bandwidth for ACR-RAS transmission. If it is determined in step 521 that there is available bandwidth for ACR-RAS transmission, the ACR returns step 507 and repeatedly performs its succeeding steps. However, if it is determined in step 521 that there is no available bandwidth for ACR-RAS transmission, the ACR proceeds to step 523.

In step 523, the ACR adds a RAS_Control_IE. Thereafter, the ACR adds an MH' in step 525 and adds a GRE header in step 527. The ACR then transmits the packet generated in the foregoing process in step 529.

Figure 6:
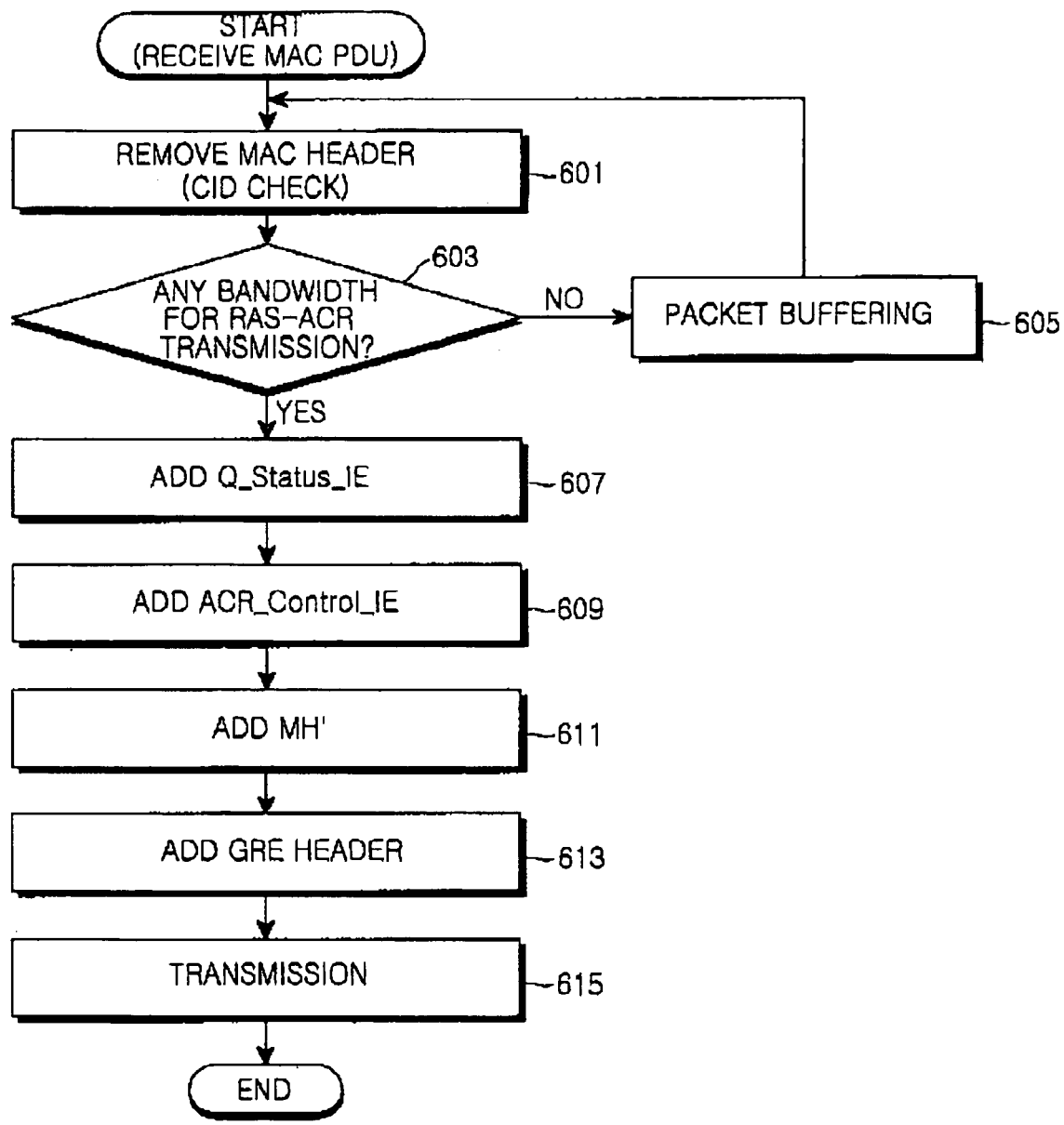
FIG. 6 is a flowchart illustrating a process of generating an uplink packet in a wireless communication system according to an embodiment of the present invention.

FIG. 6 is a flowchart illustrating a process of generating an uplink packet in a wireless communication system according to the present invention.

Referring to FIG. 6 that illustrates a process of generating an uplink packet transmitted from a RAS to an ACR, upon receipt of a MAC packet data unit (PDU), the RAS removes a MAC header from the received MAC PDU in step 601. In the MAC header removing process, the RAS checks a CID. The RAS determines in step 603 whether there is available bandwidth for RAS-ACR transmission.

If it is determined in step 603 that there is no available transmission bandwidth, the RAS performs packet buffering in step 605, and then returns to the initial step. However, if it is determined in step 603 that there is available transmission bandwidth, the RAS adds a Q_Status_IE in step 607. Thereafter, the RAS adds an ACR_Control_IE in step 609, adds an MH' in step 611, and adds a GRE header in step 613. Thereafter, the RAS transmits the packet generated in the foregoing process in step 615.

As a result of the CID check result in step 601, if it is determined that a CID value of the received MAC header is a Transport CID, the RAS adds an MH' after removing a MAC header from the corresponding MAC PDU. In this case, the RAS adds (appends) the ACR_Control_IE including the Q_Status_IE used for checking a buffer status of the RAS, to an immediate end of the MH'. Thereafter, the RAS generates a GRE packet and transmits the generated GRE packet to the ACR through a RAS-ACR tunnel. Preferably, a process of ordering the information constituting a tunnel message uses the rule used for the downlink.

As can be understood from the foregoing description, the present invention provides a message and scenario for efficient flow control between a RAS and an ACR in a communication system. In this way, it is possible to control the amount of packet data transmitted to a Target RAS during handover, and previously prevent overflow and underflow in the RAS, contributing to an increase in the efficiency of network resources.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A system for controlling data traffic in a wireless communication system, the system comprising:
a base station controller for, upon receiving specific Internet Protocol (IP) packets from a higher layer, adding thereto a modified packing sub-header (PSH) used for distinguishing between the IP packets to generate a medium access control service data unit (MAC SDU) in units of sub-blocks, grouping MAC SDUs having the same connection identifier (CID) among the modified PSH-added MAC SDUs, adding thereto a modified MAC header (MH) used for distinguishing between the groups to generate one or more tunnel messages, grouping the generated tunnel messages, generating a tunnel frame including a tunnel frame header used for distinguishing between the tunnel messages, and transmitting the generated tunnel frame; and
a base station for, if a CID value of a received MAC header is a transport CID, removing an MH from a corresponding MAC packet data unit (PDU), adding thereto a modified MH, adding a base station controller control information element included in an information element used for checking its buffer status to an end of the modified MH, generating a generic routing encapsulation (GRE) packet, and transmitting the generated GRE packet through a tunnel to the base station controller.

2. The system of claim 1, wherein the modified PSH is a header used for distinguishing between MAC SDUs in the MAC SDU group, and includes block sequence number (BSN) information, a sub-block sequence number (SSN), and length information.

3. The system of claim 2, wherein for an automatic repeat request (ARQ)-enabled connection, the SSN represents a sequence number that increases by one each time one block is transmitted.

4. The system of claim 2, wherein for an ARQ-disabled connection, the SSN represents a sequence number that is assigned to each sub-block to indicate a position in a MAC SDU in a process of segmenting the MAC SDU into sub-blocks.

5. The system of claim 4, wherein for the ARQ-disabled connection, a size of the sub-block used for the MAC SDU segmentation is determined through negotiation between the base station controller and the base station at a set time for the corresponding connection.

6. The system of claim 1, wherein the modified MH is a header defined to distinguish between MAC SDU groups in a GRE payload, and includes type information, length information and value information.

7. The system of claim 6, wherein payload information based on the type information represents a type value of a modified MH for a downlink, and the type value of the modified MH for the downlink includes base station control information element information, ARQ feedback payload information and modified PSH information.

8. The system of claim 7, wherein the base station control information element includes a control type field used for sharing buffer status information between the base station and the base station controller, and represents buffer status request information transmitted from the base station controller to the base station according to the control type value.

9. The system of claim 6, wherein payload information based on the type information represents a type value of a modified MH for an uplink, and the type value of the modified MH for the uplink includes base station controller control information element information, ARQ feedback payload information, extended type information, fragmentation sub-header information, and PSH information.

10. The system of claim 9, wherein the base station controller control information element includes a control type field used for sharing buffer status information between the base station and the base station controller, and a queue status information element (Q_Status_IE), and represents a buffer status of the base station according to the control type value.

11. The system of claim 10, wherein the Q_Status_IE includes status information of base station buffers for the downlink.

12. The system of claim 1, wherein the sub-block represents a minimum constituent unit used for generating a tunnel message from the MAC SDU.

13. A method for controlling uplink data traffic in a wireless communication system, the method comprising the steps of:

upon receiving Internet Protocol (IP) packets from a higher layer, generating at least one medium access control service data unit (MAC SDUs) in units of sub-blocks;

adding a modified packing sub-header (PSH) used for distinguishing between the MAC SDUs, to the generated MAC SDUs;

grouping MAC SDUs having the same connection identifier (CID) among the modified PSH-added MAC SDUs;

adding a modified MAC header (MH) used for distinguishing between the MAC SDU groups to generate at least one tunnel message;

grouping the generated tunnel messages, and adding thereto a tunnel frame header used for distinguishing between the tunnel messages to generate a tunnel frame; and transmitting the generated tunnel frame to a base station.

14. The method of claim 13, wherein the MAC SDU generation step comprises, upon receiving IP packets from the higher layer, adding thereto a modified PSH used for distinguishing between the received IP packets to generate a MAC SDU packed in units of sub-blocks.

15. The method of claim 13, wherein the modified PSH is a header used for distinguishing between MAC SDUs in the MAC SDU group, and includes block sequence number (BSN) information, a sub-block sequence number (SSN), and length information.

16. The method of claim 14, wherein for an automatic repeat request (ARQ)-enabled connection, the SSN represents a sequence number that increases by one each time one block is transmitted.

17. The method of claim 14, wherein for an ARQ-disabled connection, the SSN represents a sequence number that is assigned to each sub-block to indicate a position in a MAC SDU in a process of segmenting the MAC SDU into sub-blocks.

18. The method of claim 17, wherein for the ARQ-disabled connection, a size of the sub-block used for the MAC SDU segmentation is determined through negotiation between the base station controller and the base station at a set time for the corresponding connection.

19. The method of claim 13, wherein the MAC SDU group represents a set of MAC SDUs having the same CID values.

20. The method of claim 13, wherein the modified MH is a header defined to distinguish between MAC SDU groups in a generic routing encapsulation (GRE) payload, and includes type information, length information and value information.

21. The method of claim 20, wherein the type information includes payload type information including presence of sub-headers.

22. The method of claim 20, wherein the length information includes information on the total length including a MAC SDU fragment and a header.

23. The method of claim 20, wherein payload information based on the type information represents a type value of a modified MH for a downlink, and the type value of the modified MH for the downlink includes base station control information element information, ARQ feedback payload information and modified PSH information.

24. The method of claim 23, wherein the base station control information element includes a control type field used for sharing buffer status information between the base station and the base station controller, and represents buffer status request information transmitted from the base station controller to the base station according to the control type value.

25. The method of claim 20, wherein payload information based on the type information represents a type value of a modified MH for an uplink, and the type value of the modified MH for the uplink includes base station controller control information element information, ARQ feedback payload information, extended type information, fragmentation sub-header information, and PSH information.

26. The method of claim 25, wherein the base station controller control information element includes a control type field used for sharing buffer status information between the base station and the base station controller, and a queue status information element (Q_Status_IE), and represents a buffer status of the base station according to the control type value.

27. The method of claim 26, wherein the Q_Status_IE includes status information of base station buffers for the downlink.

28. The method of claim 13, wherein the sub-block represents a minimum constituent unit used for generating a tunnel message from the MAC SDU.

29. The method of claim 13, wherein the tunnel frame header includes a GRE header.

30. A method for controlling downlink data traffic in a wireless communication system, the method comprising the steps of:

if a connection identifier (CID) value of a received medium access control (MAC) header is a transport CID, removing a MAC header (MH) of a corresponding MAC packet data unit (PDU);

after removing the MH, adding thereto a modified MH to generate at least one tunnel message; and grouping the generated tunnel messages, generating a tunnel frame including a tunnel frame header used for distinguishing the tunnel messages, and transmitting the generated tunnel frame.

31. The method of claim 30, further comprising, after removing the MAC header, adding thereto an information element used for checking a buffer status of a base station itself.

32. The method of claim 30, wherein the modified MH is a header defined to distinguish between MAC SDU groups in a generic routing encapsulation (GRE) payload, and includes type information, length information and value information.

33. The method of claim 32, wherein payload information based on the type information represents a type value of a modified MH for a downlink, and the type value of the modified MH for the downlink includes base station control information element information, ARQ feedback payload information and modified PSH information.

34. The method of claim 33, wherein the base station control information element includes a control type field used for sharing buffer status information between the base station and the base station controller, and represents buffer status request information transmitted from the base station controller to the base station according to the control type value.

35. The method of claim 32, wherein payload information based on the type information represents a type value of a modified MH for an uplink, and the type value of the modified MH for the uplink includes base station controller control information element information, ARQ feedback payload information, extended type information, fragmentation subheader information, and PSH information.

36. The method of claim 35, wherein the base station controller control information element includes a control type field used for sharing buffer status information between the base station and the base station controller, and a queue status information element (Q_Status_IE), and represents a buffer status of the base station according to the control type value.

37. The method of claim 36, wherein the Q_Status_IE includes status information of base station buffers for the downlink.

* * * * *